(12) United States Patent
McCloud et al.

(10) Patent No.: US 6,198,229 B1
(45) Date of Patent: Mar. 6, 2001

(54) LUMINESCENT CONTROL BY SENSING WIND SPEED

(76) Inventors: Kevin McCloud, Great House Farm, Leigh Upon Mendip, Somerset BA3 5QZ; Donald McCloud, Thistle Lodge, 16 Beaumaris Grove, Shenley Church End, Milton Keynes, MK5 6EN, both of (GB)

(*) Notice: Subject to any disclaimer, the term of this patent is extended or adjusted under 35 U.S.C. 154(b) by 0 days.

(21) Appl. No.: 09/117,512
(22) PCT Filed: Jan. 31, 1997
(86) PCT No.: PCT/GB97/00278
§ 371 Date: Jul. 30, 1998
§ 102(e) Date: Jul. 30, 1998
(87) PCT Pub. No.: WO97/28671
PCT Pub. Date: Aug. 7, 1997

(30) Foreign Application Priority Data

Feb. 1, 1996 (GB) .................................................. 9602002

(51) Int. Cl.[7] .................................................. H05B 37/02
(52) U.S. Cl. ..................... 315/185 R; 315/154; 315/194; 315/200 A
(58) Field of Search ........................... 315/200 A, 209 R, 315/219, 185 R, 291, 194, DIG. 5, 154

(56) References Cited

U.S. PATENT DOCUMENTS

| 4,187,532 | 2/1980 | Naffier ................................. 362/186 |
| 4,492,896 | 1/1985 | Jullien ................................. 315/153 |
| 4,593,232 | * 6/1986 | McEdwards ........................ 315/199 |
| 5,013,972 | 5/1991 | Malkieli et al. ..................... 315/209 |
| 5,174,645 | 12/1992 | Chung ................................... 362/86 |
| 5,365,149 | * 11/1994 | Blakeslee et al. ............... 315/200 A |

FOREIGN PATENT DOCUMENTS

| 2729466A | * 1/1979 | (DE) . |
| 2729466 | 1/1979 | (DE) . |
| 7-37690 | 7/1993 | (JP) . |
| 08167481 | * 6/1996 | (JP) . |
| 1782506 | 12/1992 | (SU) . |

* cited by examiner

Primary Examiner—David Vu
(74) Attorney, Agent, or Firm—Westman, Champlin & Kelly, P.A.

(57) ABSTRACT

The present invention provides a control apparatus (11) for controlling luminescence produced by a light source (12) which includes a sensor (17) for sensing motion of air and a circuit (3) for varying the luminescence provided by the light source when motion of air is sensed. The sensor (17) is an air pressure sensor and all changes in the luminescence provided by the light source (12) are occasioned by sensed changes in air pressure. The present invention also provides lighting apparatus (10, 11, 12) which includes the control apparatus (11).

13 Claims, 3 Drawing Sheets

LUMINESCENT CONTROL BY SENSING WIND SPEED

REFERENCE TO RELATED APPLICATION

This application is an application filed under the provisions of 35 U.S.C. § 371, based upon International application PCT/GB97/00278, filed Jan. 31, 1997.

BACKGROUND OF THE INVENTION

The present invention relates to control apparatus for controlling luminescence provided by a light source and to lighting apparatus comprising the control apparatus.

In the past designers attempted to provide lighting apparatus which mimics a candle and which can be used to provide light similar to that of a naked flame. The problem faced by designers is to provide realism.

In DE-A-2729466 there is described lighting apparatus which uses a single lamp to simulate a single candle or a group of individual lamps to simulate a group of individual candles. The luminosity of each lamp is controlled using electronically generated signals driving Triac power switching of the mains electric supply. Each lamp is given an "address" so that each lamp can be individually controlled with different electronic signals (sixteen lamps are proposed). The electronic signals are synthesized from individual generated signals which represent four different levels of luminosity (one of which is a zero level) and six different frequencies of switching between these levels. The frequencies and levels are combined electronically to give six characteristic control signals which can be applied to each addressed lamp (i.e. six signals which have a set frequency and amplitude of lamp luminosity). These are divided into two groups, one for quiet air conditions and one for conditions where there is a strong draft.

The six characteristic control signals of DE-A2729466 are derived from observation of the behavior of a single real candle flame, its behavior in a group of mounted candles and when subjected to a draft of air.

DE-A-2729466 proposes that the six signals are adequate to give a reasonable simulation of a candle flame when switched to individual lamps in a pseudo-random manner.

To take into account the effect of a draft of air, a wind sensor in the form of a temperature sensitive resistor is used to detect the air movement which responds by triggering the selection of the first or second group of signals. It follows that the behavior of the lamp luminosity will follow a predictable sequence when the wind sensor detects quiet conditions. In a group of lamps, individual lamps will be responding to different parts of the sequence at any given moment. If the wind sensor detects a strong enough air movement to trigger the circuits into the fast frequency mode then the luminosity changes will be controlled by the second group of signals.

DE-A-2729466 proposes a solution to the problem of providing a candle flame look-alike with minimal fire risk, for use, typically, as a visual prop on a theatre stage. While the control programme for controlling operation of the lamp in DE-A-2729466 is selected having regard to a wind sensor output signal, once an operating mode (e.g. a fast frequency mode) is selected the control of the lamp is carried out in that mode independent of variations in sensed wind speed until the wind speed changes to such an extent that a different mode of operation (e.g. a slow frequency mode)is selected. When a mode of operation is selected then there will be variations in the luminescence of the lamps without any change in wind speed, but purely due to the preprogrammed signals.

The present invention provides a control apparatus for controlling luminescence provided by a light source which comprises sensor means for sensing motion of air and means for varying the luminescence provided by the light source when motion of air is sensed, characterized in that the sensor means is an air pressure sensor and all changes in the luminescence provided by the light source are occasioned by sensed changes in air pressure.

The significant different between the present invention and the systems of the prior art starts with the perceived problem to be solved. Prior art systems such as are described in DE-A-2729466 and U.S. Pat. No. 4,593,232 are primarily directed at producing a device which looks like a candle when lit and which is intended as an item of display. The present invention is aimed at producing a light source which when used to control a light source in a room or defined space produces lighting conditions which mimic those of a real candle, and as far as possible an apparatus that looks and behaves like a real candle. To this end, the luminance levels produced by the present system must be adequate (e.g. the light source must be an effective light source which consumes 20 to 100 watts of power, rather than a purely decorative light source) and the response of the lighting apparatus to its environment must closely approach that of the real candle.

The most significant response of a candle flame to its environment is the way in which the candle flame follows changes in the local air movements and pressure changes. (These can be respectively considered akin to electrical current and voltage). Since air movements create pressure changes, the concept developed for the present invention is to sense environmental pressure changes using a pressure sensor such as a microphone to generate control signals and to adjust the bandwidth of the control signals to produce a visual effect on a room illumination which simulates candle flame. The pressure sensor is the only source of the signals that control the light source and all changes in luminescence are due to changes in air pressure rather than a preprogrammed routine of variation with time.

Both U.S. Pat. No. 4,594,343 and DE-A-2729466 lack the concept of simulation and concentrate on electronically generating signals which cause the lamps to change intensity and flicker in an apparently random manner generally regardless of the space environment of the device. Although the system of DE-A-2729466 recognises an air stream which is significantly noticeable as a draft as influencing the simulated flame, the sensor is only used to switch in a more vigorous programme of lamp brightness control and does not attempt any apparent physical movement simulation.

Preferably, the light source to be controlled is an electric lamp and the means for varying the luminescence of the light source comprises means for controlling current supplied to or voltage applied across the electric lamp.

Preferably the light source to be controlled comprises a plurality of electric lamps, and the means for varying the luminescence of the light source comprises means for controlling current supplied to or voltage applied across each of the electric lamps. Preferably, each electric lamp is supplied with a periodic electrical waveform and the means for varying the luminescence of the light source varies the luminescence by synchronised switching during the period of the periodic electrical waveform. Preferably, the control apparatus introduces a phase difference in the synchronous switching of first periodic electrical waveform supplied to a first electric lamp and a second periodic electrical waveform supplied to a second electric lamp.

In U.S. Pat. No. 4,593,232 it is recognized that movement is an important characteristic of candle flame that must be simulated, hence a multi-filament lamp is used with the current/voltage applied to each filament being varied independently of the others to achieve a simulated motion. However, the control program for the lamp is entirely synthetic and ignores totally the environment. The two filaments do not have a mutually dependent 'flicker' control signal and hence the apparent flame movement will again be pseudo-random, but independently so (i.e. the flicker will not change with variations in air pressure).

Observation of a real candle flame shows that provided there is no restriction of air flow to the candle, the apparent average total luminescent power emanating from the candle varies very little with most air pressure changes and movement, unless of course it is strong enough to blow the candle out. However, because the candle flame has almost negligible mass, it will respond by physical movement to quite high frequency changes of air pressure extending as far as the lower end of the audio frequency range. It is this responsiveness which provides much of the 'flicker' effect of a candle.

The concept of using two or more filaments to achieve apparent movement of illumination is a logical step once the intellectual step has been taken to recognize that the movement of the light source is an important requirement of the simulation. However, it does not follow that a simple recognition of the need for the light source to apparently move, will logically lead to the conclusion that the movement should be controlled by means of sensing the air pressure over a fairly wide bandwidth of frequencies. Instead, a second intellectual step is required to recognise that control using an air pressure based signal will contain all the components of movement that are required, including the higher frequency 'flicker' effects that the prior art systems have created either by elaborate synthesis or inadequate ON/OFF switching.

It also follows that the dual lamp arrangement has to use lamps with filaments which are small and are responsive to the frequency of the control signals applied. A superior performance in this respect is given by the use of Halogen lamps.

Rather surprisingly, the fuller simulation of the present invention provided by use of an air pressure sensor is technically easier to achieve than the synthesis of control signals used in the prior art systems.

The present invention is different in that the simulated candle functions by responding to those air conditions which a real candle, placed in the same position, would also respond to at any given time. It produces a level of illumination which can be adjusted to match that of a candle and will illuminate a room with changing light patterns in a very similar way to a real lighted candle. It is to be expected that such a device will look as if it is behaving like a candle if sensibly constructed. In fact it is possible to stand the real and the simulated candle side by side and watch the rather uncanny similarity of behavior.

An embodiment comprising a plurality of electric lamps can comprise a plurality of pairs of electric lamps, the lamps of each pair being located adjacent to each other, wherein a first electric lamp of each pair is supplied with the first periodic electrical waveform and a second electric lamp of each pair is supplied with the second periodic electrical waveform.

Where in the specification and claims reference is made to a light source comprising a plurality of electric lamps, this should be construed as including:

1. arrangements in which separate electric bulbs are provided each with its own single filament;
2. arrangements in which a plurality of independent filaments are provided in one single bulb; and
3. arrangements in which a plurality of separate electric bulbs are provided each with a plurality of filaments.

SUMMARY OF THE INVENTION

In one embodiment, the control apparatus of the present invention comprises:

a transformer connectable to a mains electricity supply, which transformer converts the mains voltage to a lower voltage supply for use by the rest of the apparatus;

processor means for processing the lower voltage supply to generate a reference voltage of a non-sinusoidal waveform, amplifier means for amplifying a sensed signal voltage produced by the sensor means, means for providing a control voltage, combining means for combining the amplified sensed signal voltage with the control voltage to produce a first signal voltage which is the sum of the amplified sensed signal voltage and the control voltage and a second signal voltage which is the difference between the amplified sensed signal voltage and the control voltage, first comparator means for comparing the first signal voltage with the reference voltage, to produce a first control signal, second comparator means for comparing the second signal voltage with the reference voltage to produce a second control signal, a first trigger signal generator which is controlled by the first control signal and which generates a first trigger signal, a second trigger signal generator which is controlled by the second control signal and which generates a second trigger signal, a first switching means supplied with voltage by the transformer and controlled by the first trigger signal, the first switching means being in use connected to the first electric lamp and controlled to regulate power supply to the first electric lamp, and a second switching means supplied with voltage by the transformer and controlled by the second trigger signal, the second switching means being in use connected to the second electric lamp and controlled to regulate power supply to the second electric lamp.

The present invention also provides lighting apparatus comprising:

a light source, control apparatus as described above which controls the luminescence of the light source.

Preferably the light source comprises first and second electric lamps each supplied with a periodic electrical waveform and the luminescence of both is controlled by the control apparatus, the control apparatus synchronously switching each periodic electrical waveform to control the luminescence of each of the lamps and the control apparatus operating in such a way that the first lamp is supplied with a first switched waveform and the second lamp is supplied with a second switched waveform and the control apparatus introduces a phase difference between the first and second switched waveforms.

In another embodiment, the light source comprises a transparent or opaque surround for two electrical lamps which internally illuminate the surround.

In an alternative embodiment the light source comprises a plurality of transparent or opaque surrounds and a plurality of pairs of electrical lamps, each pair of electrical lamps internally illuminating one surround.

Preferably the or each surround is a cylinder configured in the shape of a wax candle and the electrical lamps are provided at the top of the cylinder.

Preferably the transformer and the control apparatus are located in the cylinder, but alternatively the transformer and the control apparatus can be located outside the cylinder and remote from the cylinder.

In one embodiment the lighting apparatus has the control apparatus which comprises sensitivity adjustment means for adjustment of sensitivity of the sensor means to variations in air pressure, which sensitivity adjustment means adjusts the sensitivity with changes in a recurring peak amplitude of sensed air pressure variations.

In another embodiment the lighting apparatus has first and second electric lamps each supplied with an alternating current electricity supply and the control apparatus in each half cycle of the alternating current electricity supply switches the supply from one lamp to the other lamp.

The principal aim of the present invention provides a more realistic imitation of a naked flame.

BRIEF DESCRIPTION OF THE ILLUSTRATIVE EMBODIMENTS

Figure 1:
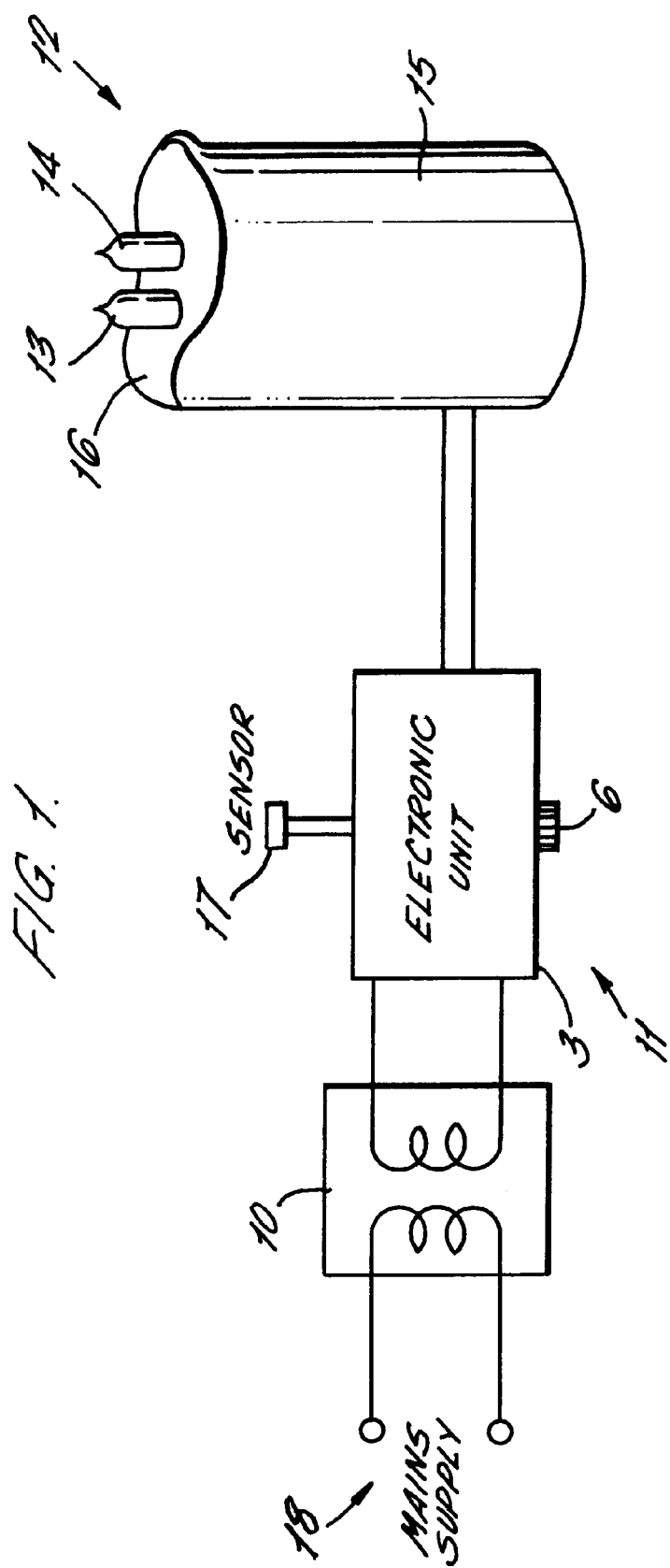
FIG. 1 is a schematic illustration of lighting apparatus according to the present invention.

In FIG. 1 there can be seen lighting apparatus comprising a transformer 10, a control apparatus 11 and a light source 12. The light source is constructed and controlled in such a way (to be described) that it simulates in overall appearance and behavior a wax candle and naked flame.

The light source 12 comprises two filaments lamps 13 and 14 located at the top of a glass cylinder 15. The glass cylinder 15 will be of a diameter to suit a final installation. The top surface 16 of the glass cylinder 15 is molded in such a way that it resembles the top of the wax column of a burning candle. The inner surface of the glass cylinder 15 is painted such that the glass cylinder 15 appears translucent. This translucence enables the light generated by the lamps 14 and 13 to pass through the glass cylinder 15 at the top portion of the glass cylinder 15 nearest the lamps 13 and 14. This internal illumination of the glass cylinder 15 gives a visual effect similar to that of a burning wax candle.

The transformer 10 will be in use connected to a mains electricity supply and will provide a low voltage suitable for operating the chosen lamps 13 and 14 and also suitable for the control apparatus 11.

The control apparatus 11 controls the degree of luminescence provided by the lamps 13 and 14 when they are illuminated. The control apparatus 11 has a sensor 17 (e.g. a microphone) which is responsive to changes in air pressure. The sensor responds to air pressure changes which, for example, occur when a door to a room is opened or closed.

The control apparatus 11 varies the luminescence of the lamps 13 and 14 in response to changes in the sensed air pressure, such that variation of air pressure results in a variation of the luminescence of the lamps in order to give an impression of a moving wax candle flame. The illumination level control 6 provides means for manual adjustment of the total luminescence of lamps 13 and 14. The light source 12 gives a movement of light and shadow in a room which is similar to the variation of light and shadow in a room which is illuminated by a wax candle. Since the variation occurs in response to the sensed air pressure signal, the resulting apparent randomness of changes in the illumination provided by the light source 12 corresponds closely with the variation in illumination provided by a wax candle flame.

Figure 2:
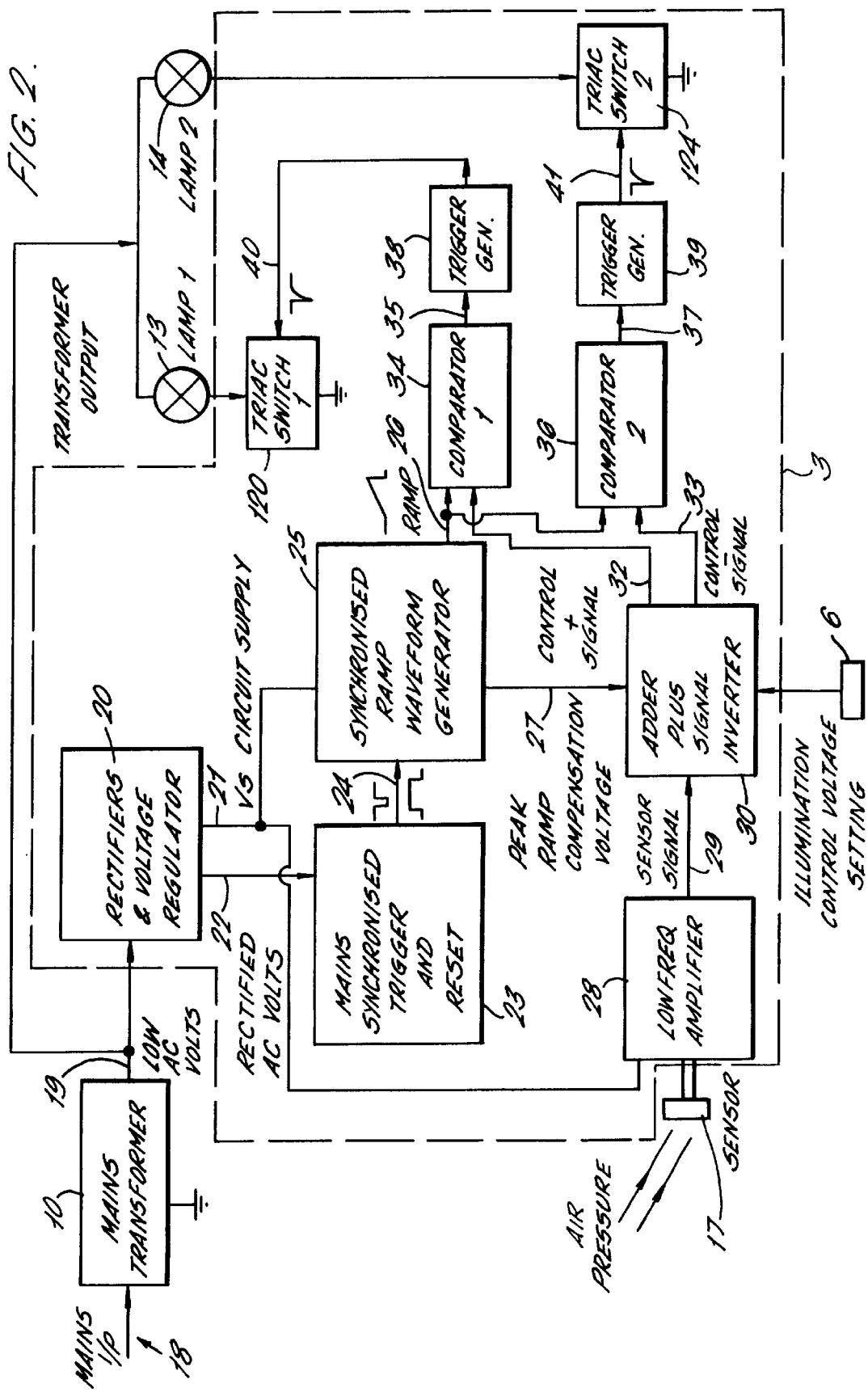
FIG. 2 is a simplified circuit diagram of the control apparatus of the lighting apparatus of FIG. 1.

The control apparatus 11 comprises an electronic unit 3 having a control circuit which is shown schematically in FIG. 2. In FIG. 2 the control circuit of the control apparatus 11 is shown within the dotted line.

In FIG. 2 the transformer 10 can be seen which is supplied by a mains supply 18. The transformer 10 provides a low voltage output of a sinusoidal waveform on the line 19 which connects the main transformer 10 to a rectifier and voltage regulator 20 which then produces two different output voltages. One output which the rectifier and voltage regulator provides is a steady 12 volt Vs on the line 21.

A second time-varying rectified output voltage is provided on line 22 and is then used by a mains synchronized trigger and reset circuit 23, which produces square waveform periodic reference signals on a line 24. These square wave signals are received by a synchronized ramp waveform generator 25 which produces a saw tooth shape periodic reference signal on the line 26. A peak ramp compensation voltage is also produced by the synchronized ramp waveform generator 25 and is output on a line 27.

The air pressure sensor 17 is connected to a low frequency amplifier 28 which receives a constant 12 volt supply voltage Vs from the rectifier and voltage regulator 20. The low frequency amplifier 28 acts both as an amplifier and also as a filter in that it amplifies only a specified bandwidth of the signals produced by the air pressure sensor 17 and does not amplify high frequencies generated by the air pressure sensor 17. The filtered amplified sensor signal is sent via line 29 to an adder plus signal inverter 30.

The adder plus signal inverter 30 receives the peak ramp compensation signal on the line 27 from the synchronized ramp waveform generator 25. The adder plus signal inverter 30 acts to set an illumination control voltage, this being derived from the filtered sensor signal on line 29 and the ramp compensator voltage on line 27 together with a signal from a manually operable controller 6 which can be used to vary the total level of lumination provided by the lamps 13 and 14. The adder plus signal inverter 30 provides two output signals, on the two lines 32 and 33.

The output signal on line 32 comprises the control voltage plus a sensor signal on line 29. On line 33 the signal comprises the control voltage less the sensor signal on line 29.

A first comparator 34 compares the voltage of the saw tooth reference signal on line 26 with the voltage on the line 32 and from the comparison produces a control signal on the line 35 which is the difference between the two signals multiplied by a pre-specified gain.

A second comparator 36 compares the signal on line 33 with the saw tooth reference signal on line 26 and provides on line 37 a control signal which is the difference between the two input signals on lines 26 and 33 multiplied by a pre-specified gain.

The control signal on line 35 controls a trigger signal generator 38 and the control signal on line 37 controls a trigger signal generator 39. The trigger signal generator 38 generates a trigger signal on line 40, the waveform of which shown in the FIG. 2. The trigger signal generator 39 generates a trigger signal on line 41, the waveform of which is also shown in FIG. 2. The trigger signal on line 40 controls a first Triac switch 120. The trigger signal on line 41 controls a second Triac switch 124.

The Triac switch 120 controls power supplied to the first lamp 13 and the Triac switch 124 controls power supplied to the second lamp 14. Power supplied to the lamps 13 and 14 is supplied from the output of the transformer 10. The Triac switches 120 and 124 are both connected to ground. When triggered the Triac switches 120 and 124 allow current to flow from the transformer through the respective lamp to ground, but when the Triac switches 120 and 124 receive no trigger impulse they prevent current flow through the lamps 13 and 14. In this way the power supplied to the lamps 13 and 14 is regulated by switching on and off synchronously with the frequency of the sinusoidal waveform on the line 19 and the luminescence of the lamps 13 and 14 is thus regulated.

It will be noted that the comparator 34 compares the saw tooth reference voltage with a signal on line 32 which comprises the control voltage plus the amplified sensor signal, while the comparator 36 compares the saw tooth reference voltage with a signal on line 33 which is the control voltage minus the amplified sensor signal. In this way, a phase difference is introduced between the outputs of the comparators 34 and 36 and therefore there is a phase difference between the periodically varying luminescence of lamp 13 and the periodically varying luminescence of lamp 14, while the total intensity of illumination is kept approximately constant.

The sensor 17 is exposed to air pressure which may vary in both strength (i.e. amplitude) and rate of change (i.e frequency components).

The bandwidth and gain of the amplifier 28 are set in such a way that the signal generated by the sensor 17 causes the trigger signal on lines 40 and 41 to control Triacs switches 120 and 124 in such a manner that the lamps 13 and 14 respond to both the amplitude and the significant frequency components of the signal generated by sensor 17.

To the observer it seems that the light emitted from the apparatus appears to be responding to the air movement in that it will be either stationary or moving with a combination of low frequency swaying and high frequency flickering and perhaps an occasional spluttering effects. However, the overall level of luminescence provided by the lamps 13 and 14 varies only slightly with changes of air movement which also accords well with the characteristics of a wax candle flame.

While above it is mentioned that the potentiometer control 6 can be used to vary the average intensity of the light provided by the two lamps 13 and 14, the intensity of the illumination can alternatively or additionally be varied by varying the power into the transformer 10 using a standard mains voltage dimmer control. The present apparatus is designed to use lamps which have a power rating of 20 to 120 watts, i.e. lamps that can be used to light a room and not just as decorations.

Figure 3:
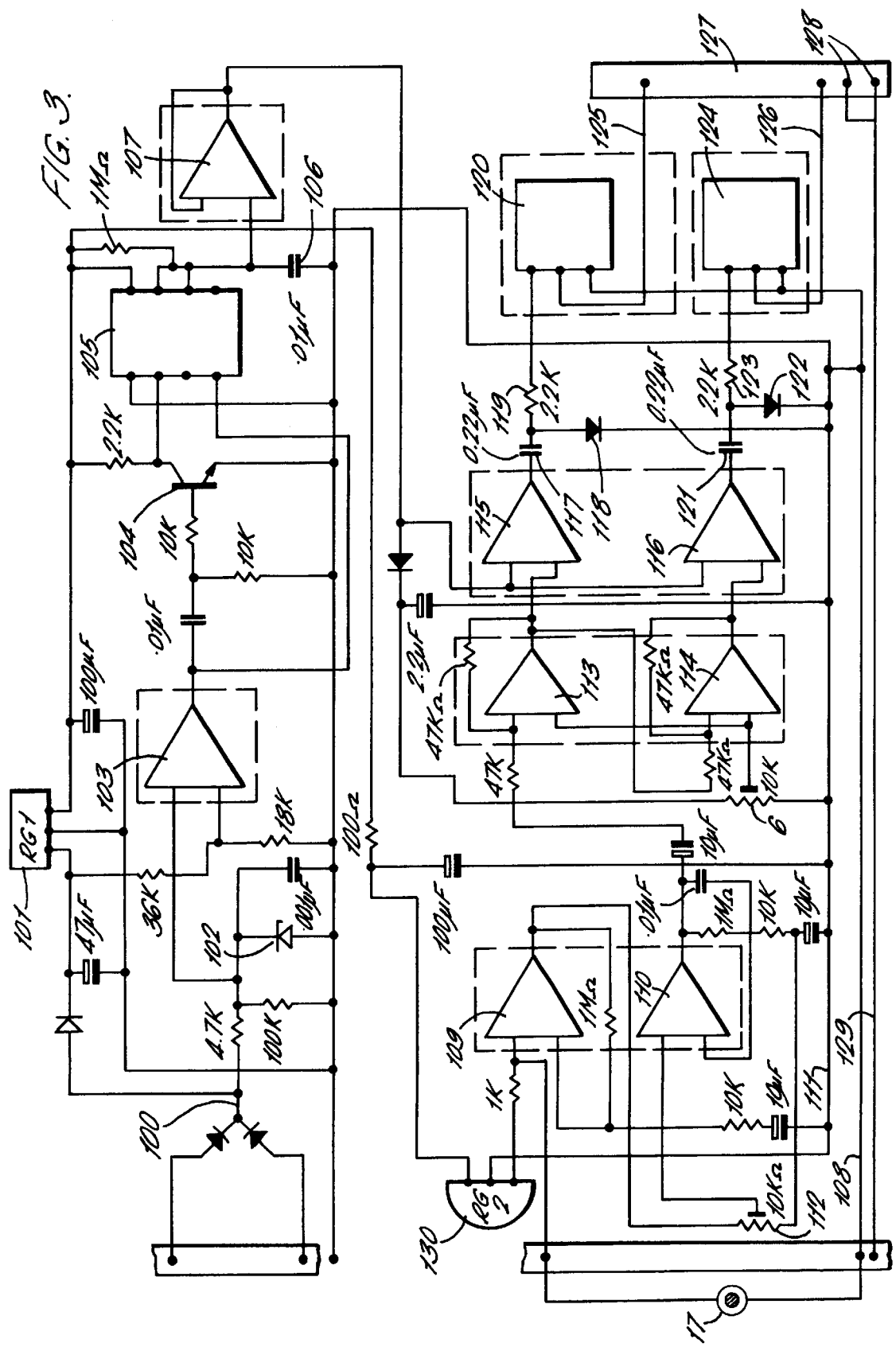
FIG. 3 is a more detailed circuit diagram of the control apparatus of the lighting apparatus of FIG. 1.

In FIG. 3 there is shown a detailed circuit diagram for the electronic circuit previously described. A brief comparison will be made between FIG. 2 and FIG. 3. In FIG. 3 it can be seen that the low AC fully rectified voltage supply is supplied at 100. The peak of this voltage is detected and the voltage is regulated by the voltage regulator 101 to a constant 12 volts. The combination of a Zener diode 102 and an Op amp 103 (used as a comparator) is used to generate a square wave which is synchronous with each half cycle of the low voltage AC supply. A defined proportion of the unregulated peak voltage signal provides a reference voltage to the Op amp 103 thereby compensating the square wave generation against variations that may occur in the amplitude of the low voltage AC supply.

The transistor 104 is used as a transistor switch in order to produce a trigger signal for the timer 105 which then produces in combination with the capacitor 106, a saw tooth signal which is then relayed to the Op amp 107 which acts as a buffer between the timer 155 and the remainder of the circuit. The reset of the timer 105 is provided by the square wave output of the Op amp 103.

The sensor 17 is connected to a four amp track 108 and supplies the sensor signal as an input to an Op amp 109 which acts as an amplifier. The voltage produced by the sensor 17 is combined with a steady 5 volts provided by a voltage regulator 130. The amplified output of Op amp 109 is then connected to an earth line 111 via a variable resistor 112. The variable resistor 112 is a voltage divider and can be used to adjust the sensitivity of the apparatus to signals generated by the sensor 17. One input of the Op amp 110 is taken from the variable resistor 112. Both of the Op amps 109 and 110 are non inverting feedback amplifiers.

The output of the amplifier 110 is the filtered amplified sensor signal previously referred to and is input to an Op amp 113, which is an inverting amplifier whose output is then relayed to a second inverting amplifier 114. Both of the inverting amplifiers 113 and 114 receive an input voltage from the variable resistance 6 which acts as a voltage divider. A d.c. voltage is derived from the peak amplitude of the saw tooth reference voltage output from the Op amp 107 and applied across the variable resistance 6. Thus the variable resistance 6 which is used to vary the average control voltage provides a voltage which is compensated for changes in the amplitude of the saw tooth waveform (which occur when the mains electricity is supplied by means of a dimmer control). The output of the Op amp 113 is relayed to an Op amp 115 and the output of the Op amp 114 is relayed to an Op amp 116. The Op amp 115 compares the output of Op amp 113 with the saw tooth reference voltage provided by the Op amp 107 and the Op amp 116 compares the output of the Op amp 114 with the saw tooth reference voltage provided by the Op amp 107.

The Op amp 115 in combination with a capacitor 117, a diode 118 and a resistor 119 constitutes means for generating a trigger signal for a first Triac 120. The Op amp 116, the capacitor 121, the diode 122 and the resistor 123 constitute means for generating a trigger signal for a second Triac 124.

Each of the Triacs 120 and 124 receive a current input from the four amp track 108 and provide a current output on a two amp track (the two amp track 125 is the output track for the Triac 120 and the two amp track 126 is the output track for the Triac 124).

The output tracks 125 and 126 end on a terminal strip 127. The terminal strip 127 also has two terminals 128 which are connected to a second four amp track 129. The Triac controls supply of a first current from the 4 amp track 108 to the 2 amp track 125, which is then connected to the lamp 13, which has a return connected to the terminal 128. Similarly the Triac 124 controls connection of the 4 amp track 108 to the 2 amp track 126. The lamp 14 is connected to the 2 amp track 126 and has a return connected to the 4 amp track 129 via the terminal 128.

The wiring to and connections between the transformer 10, the control apparatus 11, the light source 12 and the sensor 17 are designed to allow a variety of configurations in the mechanical assembly of the complete lighting apparatus. For instance, the control apparatus 11 and the sensor 17 can be mounted within a suitable diameter glass cylinder 15, which would then require only a mains electricity supply to be supplied by means of a standard mains dimmer control. The dimmer control could then provide the means of setting the average luminescence of the lamps 13 and 14. Alternatively, the transformer 10 and the control apparatus 11 can be installed in a wall mounting and then a slender glass cylinder 15 can be used which comprises only lamps 13 and 14 and the sensor 17. In this latter arrangement one transformer 10 and one control apparatus 11 can be used to control more than one light source.

The control apparatus can be used to control any light source of any lighting apparatus, such as lighting apparatus used for an artificial fire or for Christmas tree lights. In such an application means of isolating the connections of the Triacs 42 and 43 from the transformer 10 output and the control apparatus 11 could be supplied by means of opto isolators. In this case the Triac output lines 125 and 126 could connect via the lamps 13 and 14 to the mains electricity supply. While above the power input to the lighting apparatus is taken from the mains, the power supply could be a D.C. input in which case the ramp waveform generator would be configured to self trigger.

While the preferred embodiment describes the method of switching the power to the lamp 13 and 14 by the use of Triacs, alternative suitable semi-conductor switching devices could be utilized, in which case the characteristics of the Trigger Generators 38 and 39 would be changed to suit the particular device used. For instance, it may be desired to minimize voltage and current transients in the circuit and wiring, in order to minimize the electromagnetic radiation and interference that can occur on the mains electricity supply. A method could be used which ensures that the power of each half cycle of the mains supply voltage is completely utilized by supplying the voltage to lamp 13 at the start of each half cycle and then switching the supply to lamp 14 during the half cycle. The variation of the switching point in each half cycle is then controlled by a single control signal to vary the flickering effect provided by the lamps 13 and 14. To achieve such a method the Triac drive components would be altered and the luminescence control 6 would become a balance control, controlling the percentages of power supplied to the lamps 13 and 14. In this case, the total luminescence would be controlled by use of a mains supply dimmer, as mentioned above.

While above the light source described above is an electric lamp, the light source could be any controllable light source, for instance the control apparatus could control a valve which regulates flow of gas to a gas light rather than controlling Triacs for regulating electrical power supply to electric lights.

The variable resistor 112 of FIG. 3 described above which sets the amplification of the sensor signal could be replaced by an automatic gain control circuit. Such an automatic gain control circuit would be used to adjust the gain of amplifier 110 amplifying the sensor signal over a relatively long time period. The circuit could be used to modify operations of the apparatus in conditions where the air pressure variations are large over a long period of time, such as when the air pressure sensor is located near an open window on a windy day, in which case the apparatus would be made less sensitive by reducing the gain of the amplifier 110 (the automatic gain control setting a gain in dependence on the filtered amplified sensor signal). The circuit would also adjust operation of the apparatus to increase the sensitivity of the apparatus to a high sensitivity where the number of air pressure variations are not very pronounced, e.g. in a closed room in a large building, by increasing the gain of the amplifier 110.

The invention permits the provision of lighting apparatus which mimics a candle light and also which has sufficient power to light a room (some previous apparatus have not had sufficient power to effectively light a room and the light provided by the apparatus was provided for purely decorative purposes).

What is claimed is:

1. Lighting apparatus comprising:
   a light source control apparatus for controlling luminescence provided by a light source which comprises a pressure sensor for sensing motion of air and a circuit coupled to the light source for changing the luminescence of the light source when motion of air is sensed and a control means changes the luminescence of the light source in response to sensed changes in the air pressure; and
   the light source comprising first and second electric lamps located adjacent to each other, each supplied with a periodic electrical waveform and the luminescence of both lamps being controlled by the control apparatus; wherein
   the control apparatus synchronously switches each periodic electrical waveform to control the luminescence of each of the lamps and the control apparatus operates in such a way that the first lamp is supplied with a first switched waveform and the second lamp is supplied with a second switched waveform and the control apparatus introduces a phase difference between the first and second switched waveforms in order to achieve apparent movement of illumination.

2. Lighting apparatus as claimed in claim 1 wherein the control apparatus controls a power supply of 20 to 120 watts to each electric lamp.

3. Lighting apparatus as claimed in claim 1 wherein the light source comprises a plurality of pairs of first and second electric lamps, the first and second lamps of each pair being located adjacent to each other, wherein the first electric lamp of each pair is supplied with the first periodic electrical waveform and the second electric lamp of each pair is supplied with the second periodic electrical waveform.

4. Lighting apparatus as claimed in claim 3 wherein the light source comprises a plurality of surrounds and each pair of electrical lamps internally illuminates one surround, the surrounds being selected to be one of transparent and opaque.

5. Lighting apparatus as claimed in claim 1 which comprises:
   a transformer connectable to a mains electricity supply, which transformer converts the mains voltage to a lower voltage supply for use by rest of the apparatus,
   processor means for processing the lower voltage supply to generate a reference voltage of a non-sinusoidal waveform,
   amplifier means for amplifying a sensed signal voltage produced by the pressure sensor, means for providing a control voltage, combining means for combining the amplified sensed signal voltage with the control voltage to produce a first signal voltage which is the sum of the amplified sensed signal voltage and the control voltage and a second signal voltage which is the difference between the amplified sensed signal voltage and the control voltage, first comparator means for comparing the first signal voltage with the reference voltage, to produce a first control signal, second comparator means for comparing the second signal voltage with the reference voltage to produce a second control signal, a first trigger signal generator which is controlled by the first control signal and which generates a first trigger signal, a second trigger signal generator which is controlled by the second control signal and which generates a second trigger signal, a first switching means supplied with voltage by the transformer and controlled by the first trigger signal, the first switching means being in use connected to the first electric lamp and controlled to regulate power supply to the first electric lamp, and a second switching means supplied with voltage by the transformer and controlled by the second trigger signal, the second switching means being in use connected to the second electric lamp and controlled to regulate power supply to the second electric lamp.

6. Lighting apparatus as claimed in claim 5 wherein the transformer and the control apparatus are located in a cylindrical surround configured in the shape of a wax candle.

7. Lighting apparatus as claimed in claim 1 wherein the light source comprises a transparent or opaque surround for two electrical lamps which internally illuminate the surround.

8. Lighting apparatus as claimed in claim 7 wherein the surround is a cylinder configured in the shape of a wax candle and the electrical lamps are provided at the top of the cylinder.

9. Lighting apparatus as claimed in claim 8 wherein the control apparatus is located outside the cylinder and remote from the cylinder.

10. Lighting apparatus as claimed in claim 1 wherein the first and second electrical lamps are Halogen lamps.

11. Lighting apparatus as claimed in claim 10 wherein at least one Halogen lamp has at least two filaments, each of which is supplied with a different electrical waveform.

12. Lighting apparatus as claimed in claim 1 wherein the control apparatus comprises sensitivity adjustment means for adjusting sensitivity of the pressure sensor to variations in air pressure, which sensitivity adjustment means adjusts the sensitivity with changes in a recurring peak amplitude of sensed air pressure variations.

13. Lighting apparatus as claimed in claim 1 wherein the first and second electric lamps are supplied with an alternating current electricity supply and the control apparatus in each half cycle of the alternating current supply switches the supply from one lamp to the other lamp.

* * * * *